United States Patent
Jing et al.

(10) Patent No.: US 11,874,709 B2
(45) Date of Patent: Jan. 16, 2024

(54) ELECTRONIC DEVICE AND ROTATING SHAFT MECHANISM THEREOF

(71) Applicants: Beijing BOE Optoelectronics Technology Co., Ltd., Beijing (CN); BOE Technology Group Co., Ltd., Beijing (CN)

(72) Inventors: Haoran Jing, Beijing (CN); Zhanshan Ma, Beijing (CN); Ke Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 211 days.

(21) Appl. No.: 17/416,554

(22) PCT Filed: Nov. 19, 2020

(86) PCT No.: PCT/CN2020/130093
§ 371 (c)(1),
(2) Date: Jun. 21, 2021

(87) PCT Pub. No.: WO2022/104642
PCT Pub. Date: May 27, 2022

(65) Prior Publication Data
US 2022/0365571 A1 Nov. 17, 2022

(51) Int. Cl.
*G06F 1/16* (2006.01)
*F16C 11/04* (2006.01)
*E05D 3/02* (2006.01)

(52) U.S. Cl.
CPC .......... *G06F 1/1681* (2013.01); *F16C 11/045* (2013.01); *G06F 1/163* (2013.01); *E05D 3/022* (2013.01); *E05Y 2900/606* (2013.01)

(58) Field of Classification Search
None
See application file for complete search history.

(56) References Cited

U.S. PATENT DOCUMENTS 6,168,341 B1   1/2001  Chene et al.
10,353,221 B1* 7/2019  Graff .................... G02C 5/2209
(Continued)

FOREIGN PATENT DOCUMENTS

CN   2107028 U   6/1992
CN   1216083 A   5/1999
(Continued)

OTHER PUBLICATIONS

Novelty search report issued on 2020.
(Continued)

*Primary Examiner* — Anthony Q Edwards
*Assistant Examiner* — Rashen E Morrison
(74) *Attorney, Agent, or Firm* — Lippes Mathias LLP

(57) ABSTRACT

Provided is a rotating shaft mechanism of an electronic device. A first fixing assembly and a second fixing assembly in the rotating shaft mechanism are connected to each other by a first connector and a second connector. A hollow region can be reserved in the rotating shaft mechanism as the first connector and the second connector may be shorter. Thus, an external circuit of the electronic device can pass through the hollow region and be disposed in a second body of the electronic device. An electronic device are also provided.

19 Claims, 5 Drawing Sheets

(56) References Cited

U.S. PATENT DOCUMENTS

| | | | |
|---|---|---|---|
| 11,543,679 B2* | 1/2023 | Ryner | G02C 5/10 |
| 2003/0147045 A1* | 8/2003 | Fukuoka | G02C 5/2245 |
| | | | 351/153 |
| 2012/0155032 A1 | 6/2012 | Shih | |
| 2012/0200934 A1* | 8/2012 | Fujishiro | G02B 27/0179 |
| | | | 359/630 |
| 2016/0091732 A1* | 3/2016 | Wang | G02C 5/2218 |
| | | | 351/114 |
| 2019/0250412 A1 | 8/2019 | Jiang | |
| 2021/0063774 A1 | 3/2021 | Wang et al. | |
| 2021/0064096 A1* | 3/2021 | Channaiah | G06F 1/1679 |

FOREIGN PATENT DOCUMENTS

| | | |
|---|---|---|
| CN | 200944161 Y | 9/2007 |
| CN | 204212575 U | 3/2015 |
| CN | 205139498 U | 4/2016 |
| CN | 206377138 U | 8/2017 |
| CN | 108196629 A | 6/2018 |
| CN | 108457545 A | 8/2018 |
| CN | 108644224 A | 10/2018 |
| CN | 108761795 A | 11/2018 |
| CN | 108776393 A | 11/2018 |
| CN | 208506406 U | 2/2019 |
| CN | 109782447 A | 5/2019 |
| CN | 208883227 U | 5/2019 |
| CN | 110131542 A | 8/2019 |
| CN | 110673343 A | 1/2020 |
| CN | 110908122 A | 3/2020 |
| CN | 111610828 A | 9/2020 |
| CN | 111624773 A | 9/2020 |
| KR | 101893953 B1 | 9/2018 |
| WO | 2020038486 A1 | 2/2020 |

OTHER PUBLICATIONS

China National Intellectual Property Administration, First office action of Chinese application No. 202080002898.X dated May 26, 2023, which is foreign counterpart application of this US application.

* cited by examiner

ELECTRONIC DEVICE AND ROTATING SHAFT MECHANISM THEREOF

CROSS-REFERENCE TO RELATED APPLICATION

The present application is a 371 of PCT Application No. PCT/CN2020/130093, filed on Nov. 19, 2020, the entire contents of which are incorporated by reference herein.

TECHNICAL FIELD

The present disclosure relates to the field of mechanical technologies, and in particular, relates to an electronic device and a rotating shaft mechanism thereof.

BACKGROUND

A wearable device like a pair of glasses may include: a casing for encapsulating a display screen, and two temples which may be respectively rotatably connected to one end of the casing. When in use, the temples may be rotated in a direction distal from the casing for the convenience of a user in wearing the glasses. Where the glasses are not used, the temples may be folded in a direction proximal to the casing to reduce a space occupied by the wearable device.

SUMMARY

The present disclosure provides an electronic device and a rotating shaft mechanism thereof. The technical solutions are as follows.

In one aspect, a rotating shaft mechanism of an electronic device is provided. The rotating shaft mechanism includes:
  a first fixing assembly, configured to be fixedly connected to a first body of the electronic device;
  a second fixing assembly, configured to be fixedly connected to a second body of the electronic device; and
  a first connector and a second connector, wherein the first connector is rotatably connected to the first fixing assembly and one end of the second connector, and the other end of the second connector is fixedly connected to the second fixing assembly;
  wherein a length of the first connector in a target direction and a length of the second connector in the target direction are both less than a length of the first fixing assembly in the target direction, and are both less than a length of the second fixing assembly in the target direction, the target direction being an extending direction of a rotation axis of the first fixing assembly and the second fixing assembly.

Optionally, the second connector includes: a first connecting portion having a rod shape, a second connecting portion, and a third connecting portion having a rod shape; wherein
  one end of the first connecting portion is rotatably connected to the first fixing assembly by the first connector, and a first through hole is formed in the other end of the first connecting portion; and the second connecting portion is disposed in the first through hole, the second connecting portion is fixedly connected to one end of the third connecting portion, and the other end of the third connecting portion is fixedly connected to the second fixing assembly;
  wherein a sum of lengths of the second connecting portion and the third connecting portion in an axial direction of the first through hole is greater than a depth of the first through hole.

Optionally, the first through hole includes: a first sub-through hole and a second sub-through hole which are coaxial, wherein the first sub-through hole is distal from the first fixing assembly relative to the second sub-through hole, and an aperture of the first sub-through hole is less than an aperture of the second sub-through hole; wherein
  the second connecting portion is disposed in the second sub-through hole, and a diameter of the second connecting portion is greater than the aperture of the first sub-through hole and less than the aperture of the second sub-through hole; and
  a diameter of the third connecting portion is less than the aperture of the first sub-through hole.

Optionally, the second connector further includes: an elastic member sleeved onto the third connecting portion;
  wherein the elastic member is disposed in the second sub-through hole, and a diameter of the elastic member is greater than the aperture of the first sub-through hole and less than the aperture of the second sub-through hole.

Optionally, the elastic member includes at least one spring.

Optionally, a groove in communication with the first through hole is formed in a side wall of the first connecting portion, and an extending direction of the groove is parallel to an extending direction of the first connecting portion.

Optionally, the first fixing assembly includes: a first supporting plate and a connecting plate fixedly connected to the first supporting plate;
  wherein the connecting plate is perpendicular to the first supporting plate, is disposed on one side of the first supporting plate proximal to the second fixing assembly, and is rotatably connected to the first connector.

Optionally, the first connector is a rod-shaped structure;
  the connecting plate includes a first plate body and a second plate body which are spaced apart in the target direction, wherein the first plate body is parallel to the second plate body, and a distance between the first plate body and the second plate body is less than or equal to the length of the first connector in the target direction;
  one end of the second connector is disposed between the first plate body and the second plate body; and
  a second through hole is formed in the first plate body, a third through hole is formed in the second plate body, and a fourth through hole is formed in one end of the second connector, wherein the first connector is disposed in the second through hole, the third through hole, and the fourth through hole.

Optionally, the first fixing assembly further includes: a limiting plate fixedly connected to the first supporting plate;
  wherein the limiting plate is disposed on one side of the first supporting plate proximal to the second fixing assembly, and a gap is defined between the limiting plate and the connecting plate in the target direction.

Optionally, the limiting plate includes: a third plate body and a fourth plate body which are spaced apart in the target direction and opposite to each other;
  wherein the second fixing assembly includes: a second supporting plate, and a fifth plate body fixedly connected to the second supporting plate, wherein the fifth plate body is disposed on one side of the second supporting plate proximal to the first fixing assembly, and is disposed between the third plate body and the fourth plate body.

Optionally, the second fixing assembly includes: a second supporting plate and a connecting structure fixedly connected to the second supporting plate;

wherein the connecting structure is disposed on one side of the second supporting plate distal from the first fixing assembly, and a fifth through hole is formed in the connecting structure, an axis of the fifth through hole being parallel to the second supporting plate; and wherein the other end of the second connector is disposed in the fifth through hole and is fixedly connected to the second fixing assembly.

Optionally, a sixth through hole is further formed in the connecting structure, wherein an axis of the sixth through hole is perpendicular to the second supporting plate, and intersected with the axis of the fifth through hole; and the rotating shaft mechanism further includes: a riveting member;

wherein the riveting member is disposed in the sixth through hole and is fixedly connected to the other end of the second connector.

Optionally, the second fixing assembly further includes: a supporting structure fixedly connected to the second supporting plate;

wherein a seventh through hole is formed in the supporting structure, the second connector being disposed in the seventh through hole;

wherein an axis of the seventh through hole is parallel to the axis of the fifth through hole.

Optionally, the first connector is a screw.

Optionally, at least one first connection through holes is formed in the first fixing assembly, wherein each of the at least one first connection through hole is configured to be connected to the first body of the electronic device.

Optionally, at least one second connection through hole is formed in the second fixing assembly, wherein each of the at last one second connection through hole is configured to be connected to the second body of the electronic device.

In another aspect, an electronic device is provided. The electronic device includes a first body, a second body, and the rotating shaft mechanism as described above;

wherein the first body and the second body are rotatably connected by the rotating shaft mechanism.

Optionally, the electronic device further includes an electronic element and an external circuit connected to the electronic element; wherein the electronic element is disposed in the first body, one end of the external circuit is connected to the electronic element, and the other end of the external circuit passes through a hollow region in the rotating shaft mechanism to be disposed in the second body; and wherein the hollow region includes: a region not shielded by the first connector in the first fixing assembly of the rotating shaft mechanism, and a region not shielded by the second connector in the second fixing assembly of the rotating shaft mechanism.

Optionally, the electronic device is a wearable device, wherein the wearable device further includes: a display screen;

wherein the first body is a casing for encapsulating the display screen, and the second body is a temple of the wearable device.

Optionally, the wearable device is a virtual reality device or an augmented reality device.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and advantages of the present disclosure, the embodiments of the present disclosure are described in detail hereinafter with reference to the accompanying drawings.

In the related art, the wearable device like the glasses may further include an electronic element and an external circuit. The electronic element may be disposed in the casing, and the external circuit may be disposed outside the casing and is connected to the electronic element to provide a signal for the electronic element.

However, the external circuit outside the casing is prone to damages, resulting in poorer reliability of the wearable device.

Figure 1:
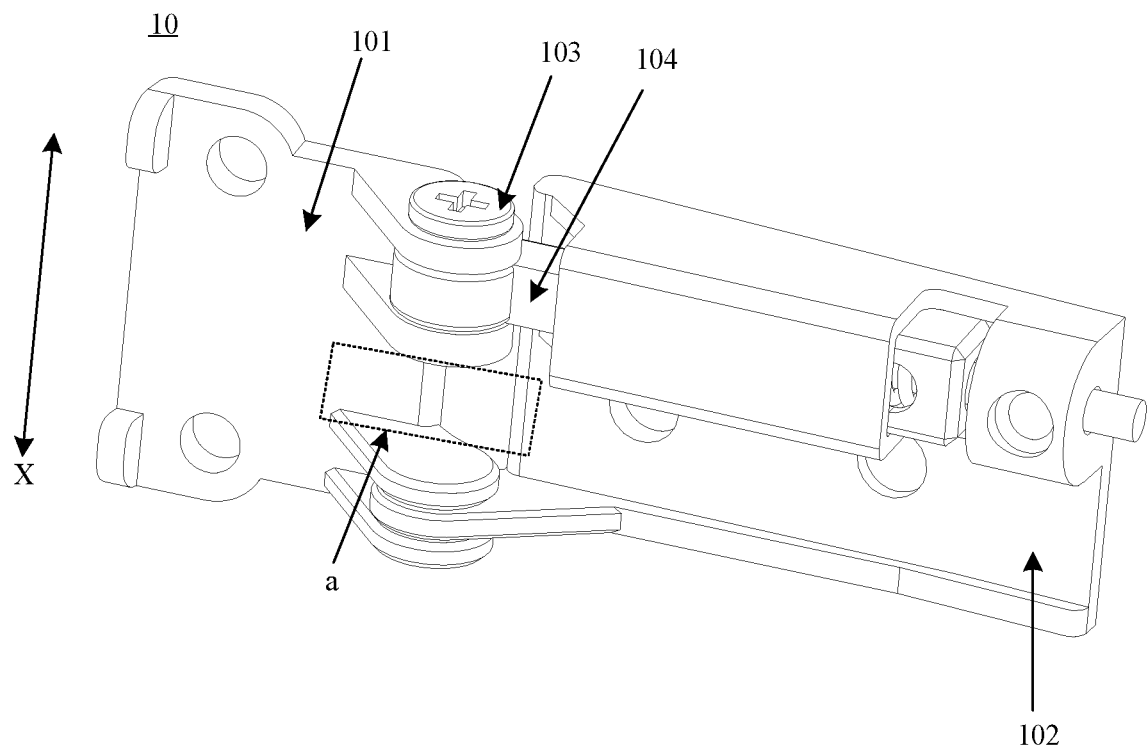
FIG. 1 is a schematic structure diagram of a rotating shaft mechanism of an electronic device according to an embodiment of the present disclosure.
Figure 2:
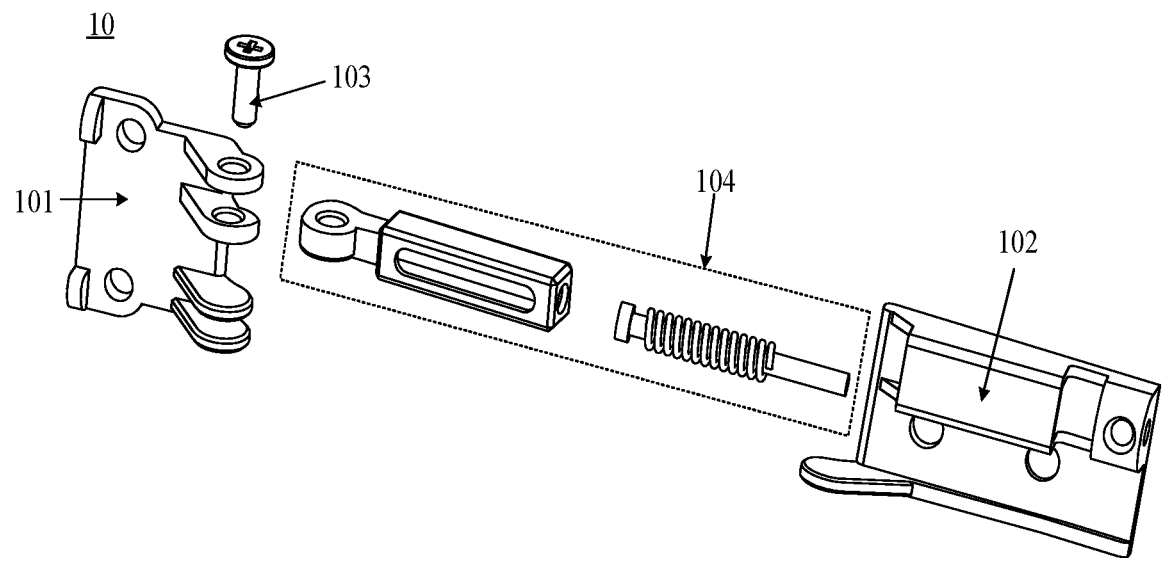
FIG. 2 is an explosive schematic diagram of the rotating shaft mechanism shown in FIG. 1.

FIG. 1 is a schematic structure diagram of a rotating shaft mechanism of an electronic device according to an embodiment of the present disclosure. FIG. 2 is an explosive schematic diagram of the rotating shaft mechanism shown in FIG. 1. Referring to FIGS. 1 and 2, the rotating shaft mechanism 10 may include: a first fixing assembly 101, a second fixing assembly 102, a first connector 103, and a second connector 104.

In the embodiment of the present disclosure, the first connector 103 may be rotatably connected to the first fixing assembly 101 and one end of the second connector 104. In addition, the other end of the second connector 104 may be fixedly connected to the second fixing assembly 102. Thus, the first fixing assembly 101 and the second fixing assembly 102 can be rotatably connected to each other.

Since the first fixing assembly 101 is configured to be fixedly connected to a first body of the electronic device and the second fixing assembly 102 is configured to be fixedly connected to a second body of the electronic device, the first body and the second body may be rotated relatively when the first fixing assembly 101 and the second fixing assembly 102 are rotated relatively. That is, the rotational connection between the first body and the second body of the electronic device can be achieved by arranging the rotating shaft mechanism according to the embodiment of the present disclosure in the electronic device.

In the embodiment of the present disclosure, a length of the first connector 103 in a target direction X and a length of the second connector 104 in the target direction X are both less than a length of the first fixing assembly 101 in the target direction X, and are both less than a length of the second fixing assembly 102 in the target direction X. The target direction X refers to an extending direction of a rotation axis of the first fixing assembly 101 and the second fixing assembly 102.

That is, the first connector 103 and the second connector 104 are both shorter, and thus, a hollow region A for placing an external circuit of the electronic device can be reserved in the rotating shaft mechanism. Thus, the external circuit of the electronic device may pass through the hollow region A of the rotating shaft mechanism and be disposed in the second body. The second body can protect the external circuit to avoid damages to the external circuit, such that the reliability of the electronic device is higher. In addition, the external circuit is disposed in the second body, and thus, the aesthetics of the electronic device is better.

In summary, the present disclosure provides the rotating shaft mechanism of the electronic device, and the first fixing assembly and the second fixing assembly in the rotating shaft mechanism are connected to each other by the first connector and the second connector. The hollow region can be reserved in the rotating shaft mechanism as the first connector and the second connector may be shorter. Thus, the external circuit of the electronic device may pass through the hollow region and be disposed in the second body of the electronic device. The second body can protect the external circuit to avoid damages to the external circuit, such that the reliability of the electronic device is higher. In addition, since the external circuit is disposed in the second body of the electronic device, the aesthetics of the electronic device is better.

Figure 3:
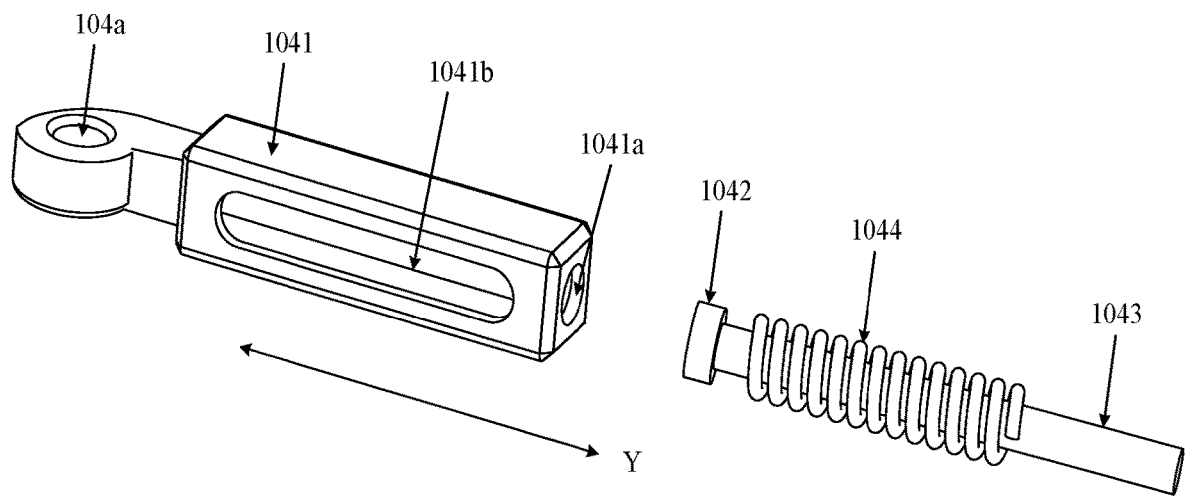
FIG. 3 is a schematic structure diagram of a second connector according to the embodiment of the present disclosure.

FIG. 3 is a schematic structure diagram of a second connector according to the embodiment of the present disclosure. Referring to FIG. 3, the second connector 104 may include: a first connecting portion having a rod shape 1041, a second connecting portion 1042, and a third connecting portion having a rod shape 1043.

One end of the first connecting portion 1041 may be rotatably connected to the first fixing assembly 101 by the first connector 103, and a first through hole 1041*a* may be formed in the other end of the first connecting portion 1041. The second connecting portion 1042 may be disposed in the first through hole 1041*a*, and the second connecting portion 1042 may be fixedly connected to one end of the third connecting portion 1043, and the other end of the third connecting portion 1043 may be fixedly connected to the second fixing assembly 102.

Here, a sum of lengths of the second connecting portion 1042 and the third connecting portion 1043 in an axial direction Y of the first through hole 1041*a* may be greater than a depth of the first through hole 1041*a*. That is, the second connecting portion 1042 is disposed in the first through hole 1041*a*, and part of the third connecting portion 1043 is disposed in the first through hole 1041*a*, and the remaining part of the third connecting portion 1043 is disposed outside the first through hole 1041*a*.

In the embodiment of the present disclosure, the second connecting portion 1042 and the third connecting portion 1043 may be an integral structure, namely, may be manufactured by a one-time manufacturing process; or, the second connecting portion 1042 and the third connecting portion 1043 may be manufactured by twice manufacturing processes, and the second connecting portion 1042 is connected to one end of the third connecting portion 1043 upon completion of the manufacturing.

Figure 4:
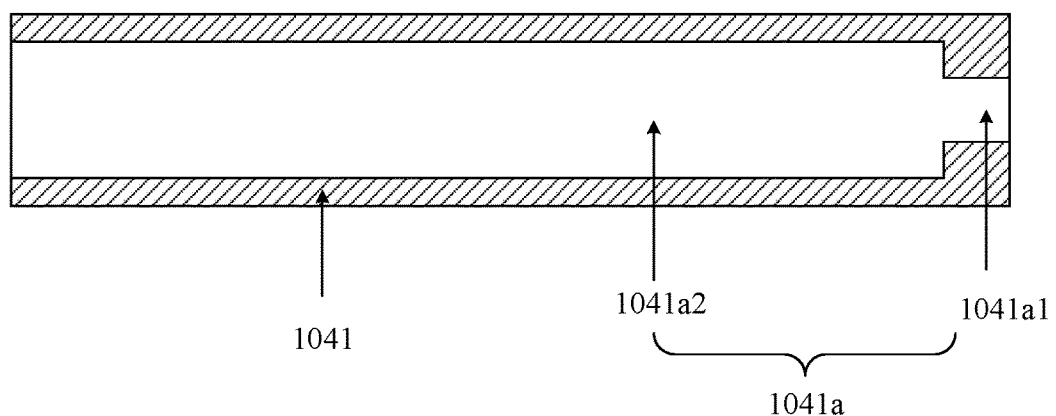
FIG. 4 is a sectional view of a first connecting portion according to an embodiment of the present disclosure.

FIG. 4 is a sectional view of a first connecting portion according to an embodiment of the present disclosure. Referring to FIG. 4, the first through hole 1041*a* may include a first sub-through hole 1041*a*1 and a second sub-through hole 1041*a*2 which are coaxial. The first sub-through hole 1041*a*1 is distal from the first fixing assembly 101 relative to the second sub-through hole 1041*a*2, and an aperture of the first sub-through hole 1041*a*1 is less than an aperture of the second sub-through hole 1041*a*2. The second connecting portion 1042 may be disposed in the second sub-through hole 1041*a*2, and a diameter of the second connecting portion 1042 is greater than the aperture of the first sub-through hole 1041*a*1 and less than the aperture of the second sub-through hole 1041*a*2. A diameter of the third connecting portion 1043 is less than the aperture of the first sub-through hole 1041*a*1.

The second connecting portion 1042 is disposed in the second sub-through hole 1041*a*2, and one end of the third connecting portion 1043 is connected to the second connecting portion 1042, and the other end of the third connecting portion 1043 may pass through the first sub-through hole 1041*a*1 to be connected to the second fixing assembly 102.

In the embodiment of the present disclosure, by setting the greater diameter of the second connecting portion 1042, the second connecting portion 1042 may be prevented from being pulled out by the third connecting portion 1042, such that the second connecting portion 1042 is always disposed in the sub-through hole 1041*a*2, thereby ensuring the reliability of the connection between the second connecting portion 1042 and the first connecting portion 1041. In addition, by setting the less diameter of the third connecting portion 1043, the third connecting portion 1043 can pass through the first sub-through hole 1041*a*1 to be connected to the second fixing assembly 102, such that the reliability of the connection between the second connector 104 and the second fixing assembly 102 is ensured.

Referring to FIG. 3, the second connector 104 may further include: an elastic member 1044 sleeved onto the third connecting portion 1043. The elastic member 1044 may be disposed in the second sub-through hole 1041*a*2, and a diameter of the elastic member 1044 may be greater than the aperture of the first sub-through hole 1041*a*1 and less than the aperture of the second sub-through hole 1041*a*2.

Figure 5:
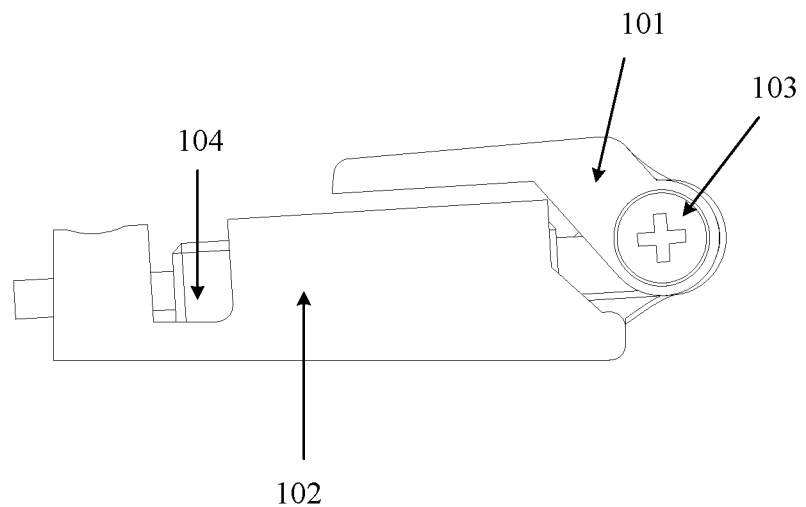
FIG. 5 is a schematic structure diagram of a rotating shaft mechanism of another electronic device according to an embodiment of the present disclosure.
Figure 6:
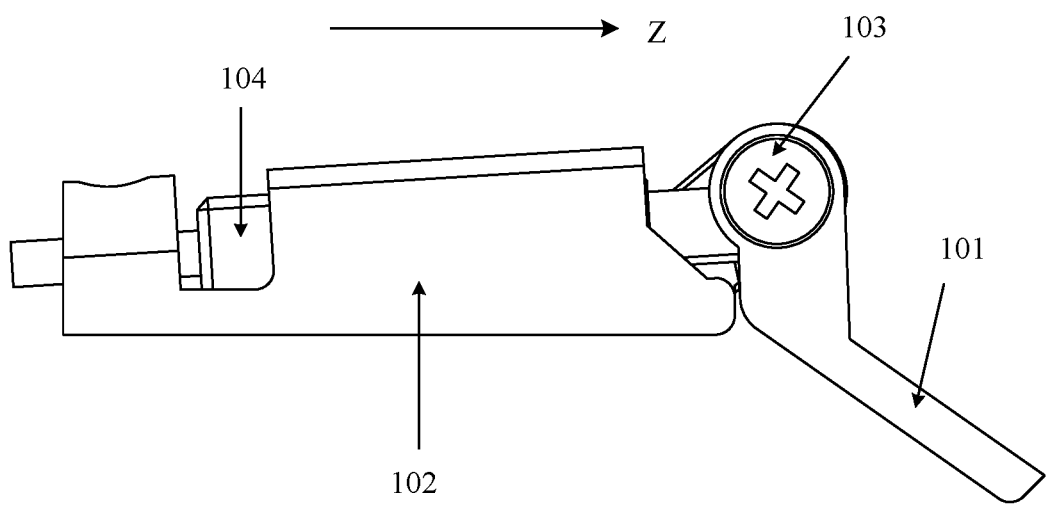
FIG. 6 is a schematic structure diagram of a rotating shaft mechanism of yet another electronic device according to an embodiment of the present disclosure.

In an exemplary embodiment, when the rotating shaft mechanism 10 is rotated from a state in FIG. 5 to a state in FIG. 6, the first connecting portion 1041 in the second connector 104 may move toward one side (a Z direction in FIG. 6) proximal to the first fixing assembly 101, such that the elastic member 1044 disposed in the second sub-through hole 1041*a*2 can be compressed under the action of the second connecting portion 1042. In this case, the elastic member 1044 may generate a reverse force which may endow the rotating shaft mechanism 10 with a resilient force. Here, a direction of the reverse force is in a direction (opposite to the Z direction) toward the second fixing assembly 102.

Optionally, a rotation angle of the first fixing assembly 101 and the second fixing assembly 102 may range from 0 degrees to 220 degrees. For example, the rotation angle of the first fixing assembly 101 and the second fixing assembly 102 may be 200 degrees.

Assuming that the electronic device is an eyeglass-type wearable device, when a user wears the electronic device, the rotation angle of the first fixing assembly 101 and the second fixing assembly 102 is greater than 90 degrees, indicating that a head circumference of a user is greater. At this time, the elastic member 1044 may generate a reverse force, such that the head of the user is clamped with the resilient force of the rotating shaft mechanism 10, thereby preventing the wearable device from falling from the head of the user.

Optionally, referring to FIG. 3, the elastic member 1044 may include at least one spring. The elastic member 1044 may also be other elastic structures, and the type of the elastic member 1044 is not limited in the embodiments of the present disclosure.

Referring to FIG. 3, a groove 1041b in communication with the first through hole 1041a may be formed in a side wall of the first connecting portion 1041, and an extending direction of the groove 1041b may be parallel to an extending direction of the first connecting portion 1041. By forming the groove 1041b in the side wall of the first connecting portion 1041, it is convenient for the user to check the movement of the second connecting portion 1042 in the first connecting portion 1041 by the groove 1041b.

In the embodiment of the present disclosure, since the second connecting portion 1042 is fixedly connected to one end of the third connecting portion 1043 and the diameter of the second connecting portion 1042 is greater than the aperture of the first sub-through hole 1041a1, the second connecting portion 1042 cannot be disposed in the first connecting portion 1041 from one side of the first sub-through hole 1041a1.

Figure 7:
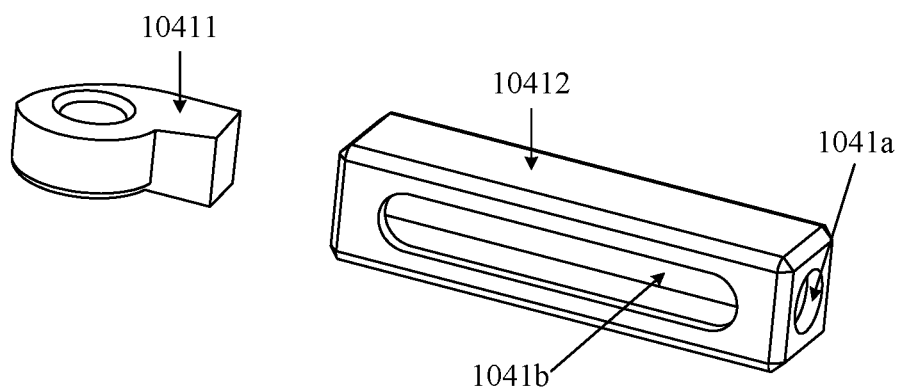
FIG. 7 is a schematic structure diagram of a first connecting portion according to an embodiment of the present disclosure.

Thus, referring to FIG. 7, the first connecting portion 1041 may include: a first connecting part 10411 and a second connecting part 10412. A connecting rod (not shown in the figure) may be provided at one end of the first connecting part 10411 proximal to the second connecting part 10412. Accordingly, a connecting hole (not shown in the figure) may be formed in one end of the second connecting part 10412 proximal to the first connecting part 10411, and may be part of the first through hole 1041a proximal to the first fixing assembly 101.

In the embodiment of the present disclosure, an assembling process of the first connecting portion 1041, the second connecting portion 1042, the third connecting portion 1043, and the elastic member 1044 may be as follows. Firstly, the elastic member 1044 sleeves the third connecting portion 1043. Secondly, the second connecting portion 1042, the third connecting portion 1043, and the elastic member 1044 are placed in the first through hole 1041a from one side of the connecting hole, such that the second connecting portion 1042 is proximal to the first connecting part 10411 relative to the third connecting portion 1043. Finally, the connecting rod of the first connecting part 10411 is connected to the connecting hole of the second connecting part 10412.

Optionally, an external thread may be disposed on the outer side of the connecting rod, and the connecting hole may have an internal thread. That is, the first connecting part 10411 and the second connecting part 10412 may be in threaded connection with each other.

Figure 8:
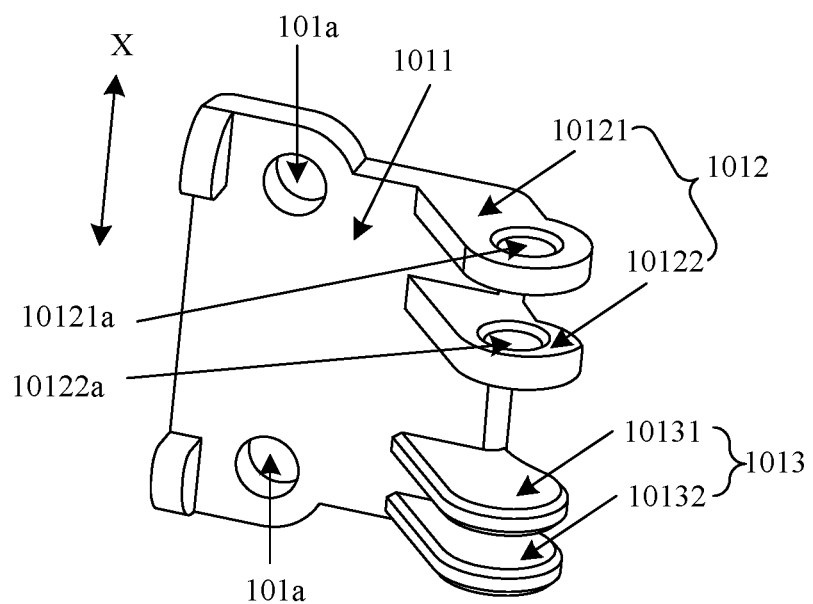
FIG. 8 is a schematic structure diagram of a first fixing assembly according to an embodiment of the present disclosure.

FIG. 8 is a schematic structure diagram of a first fixing assembly according to an embodiment of the present disclosure. Referring to FIG. 8, the first fixing assembly 101 may include: a first supporting plate 1011, and a connecting plate 1012 fixedly connected to the first supporting plate 1011. The connecting plate 1012 may be perpendicular to the first supporting plate 1011, and is disposed on one side of the first supporting plate 1011 proximal to the second fixing assembly 102. The connecting plate 1012 may be rotatably connected to the first connector 103.

Optionally, the first connector 103 may be a rod-shaped structure, for example, may be a pin. The connecting plate 1012 may include a first plate body 10121 and a second plate body 10122 which are spaced apart in the target direction. The first plate body 10121 may be parallel to the second plate body 10122, and a distance between the first plate body 10121 and the second plate body 10122 may be less than or equal to the length of the first connector 103 in the target direction X.

One end of the second connector 104 may be disposed between the first plate body 10121 and the second plate body 10122. Referring to FIG. 8, second through hole 10121a may be formed in the first plate body 10121, and third through hole 10122a may be formed in the second plate body 10122. Referring to FIG. 3, a fourth through hole 104a may be formed in one end of the second connector 104. Since the distance between the first plate body 10121 and the second plate body 10122 is less than or equal to the length of the first connector 103 in the target direction X, the first connector 103 may be disposed in the second through hole 10121a, the third through hole 10122a, and the fourth through hole 104a to connect the first fixing assembly 101 with the second connector 104.

Referring to FIG. 8, the first fixing assembly 101 may further include: a limiting plate 1013 fixedly connected to the first supporting plate 1011. The limiting plate 1013 may be disposed on one side of the first supporting plate 1011 proximal to the second fixing assembly 102, and a gap may be defined between the limiting plate 1013 and the connecting plate 1012 in the target direction X. By disposing the limiting plate 1013, the second fixing assembly 102, and the first fixing assembly 101 can be prevented from moving relatively in the target direction X, such that the stability of the connection between the first fixing assembly 101 and the second fixing assembly 102 is ensured.

In addition, since the gap is defined (the gap may be a reserved hollow region a) between the limiting plate 1013 and the connecting plate 1012 in the target direction X, the external circuit of the electronic device may pass through the gap to be disposed in the second body of the electronic device, avoiding damages to the external circuit.

Figure 9:
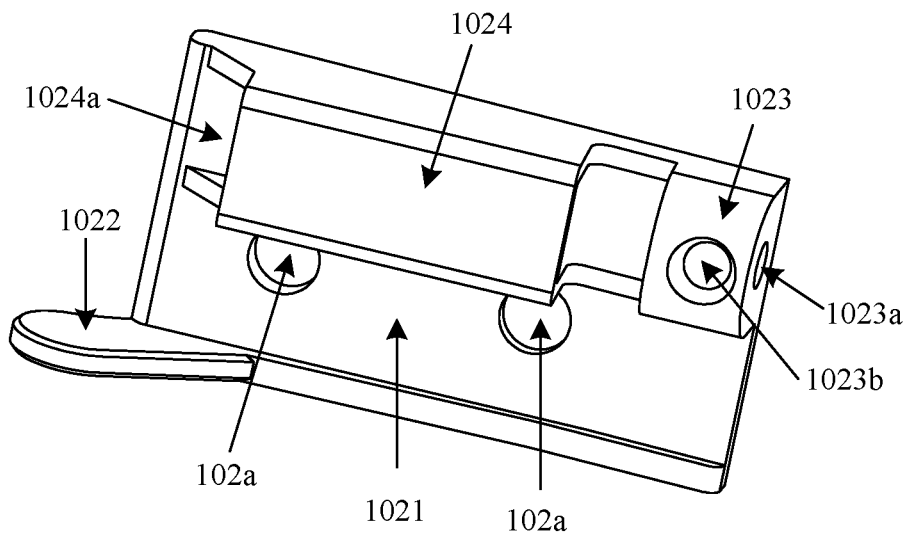
FIG. 9 is a schematic structure diagram of a second fixing assembly according to an embodiment of the present disclosure.

Referring to FIG. 8, the limiting plate 1013 may include: a third plate body 10131 and a fourth plate body 10132 which are spaced apart in the target direction X and are opposite to each other. FIG. 9 is a schematic structure diagram of a second fixing assembly according to an embodiment of the present disclosure. Referring to FIG. 9, the second fixing assembly 102 may include: a second supporting plate 1021, and a fifth plate body 1022 fixedly connected to the second supporting plate 1021. The fifth plate body 1022 may be disposed on one side of the second supporting plate 1021 proximal to the first fixing assembly 101, and the fifth plate body 1022 may be disposed between the third plate body 10131 and the fourth plate body 10132.

The fifth plate body 1022 in the second fixing assembly 102 is disposed between the third plate body 10131 and the fourth plate body 10132 in the first fixing assembly 101, such that the first fixing assembly 101 and the second fixing assembly 102 are prevented from relatively shaking in the target direction X, thereby ensuring the stability of the rotating shaft mechanism 10.

Referring to FIG. 9, the second fixing assembly 102 may further include: a connecting structure 1023 fixedly connected to the second supporting plate 1021. The connecting structure 1023 may be disposed on one side of the second supporting plate 1021 distal from the first fixing assembly 101. A fifth through hole 1023a may be formed in the connecting structure 1023. The axis of the fifth through hole 1023a may be parallel to the second supporting plate 1021. The other end of the second connector 104 may be disposed in the fifth through hole 1023a, and the other end of the second connector 104 may be fixedly connected to the second fixing assembly 102.

Optionally, referring to FIG. 9, a sixth through hole 1023b is further formed in the connecting structure 1023. An axis of the sixth through hole 1023b may be perpendicular to the second supporting plate 1021, and intersected with the axis of the fifth through hole 1023a.

The other end of the second connector 104 may be disposed in the fifth through hole 1023a, and is fixedly connected to the second fixing assembly 102 by the sixth through hole 1023b. By forming the fifth through hole 1023a and the sixth through hole 1023b in the connecting structure 1023 of the second fixing assembly 102, the second connector 104 and the second fixing assembly 102 can be connected conveniently, such that the connection reliability is ensured.

Optionally, the rotating shaft mechanism 10 may further include a riveting member (not shown in the figure). The other end of the third connecting portion 1043 in the second connector 104 may be disposed in the fifth through hole 1023a. The riveting member may pass through the sixth through hole 1023b to be fixedly connected to the other end of the third connecting portion 1043. Thus, the third connecting portion 1043 may be fixed in the fifth through hole 1023a, thereby ensuring the reliability of the connection between the second connector 104 and the second fixing assembly 102.

Referring to FIG. 9, the second fixing assembly 102 may further include: a supporting structure 1024 fixedly connected to the second supporting plate 1021. A seventh through hole 1024a is formed in the supporting structure 1024. The second connector 104 may be disposed in the seventh through hole 1024a. The axis of the seventh through hole 1024a may be parallel to the axis of the fifth through hole 1023a. By disposing the supporting structure 1024 in the second fixing assembly 102, the second connector 104 may be disposed in the seventh through hole 1024a of the supporting structure 1024, such that support is provided for the second connector 104, thereby ensuring the reliability of the connection between the second connector 104 and the second fixing assembly 102.

In the embodiment of the present disclosure, the first supporting plate 1011, the connecting plate 1012, and the limiting plate 1013 included in the first fixing assembly 101 may be an integral structure. That is, the first supporting plate 1011, the connecting plate 1012 and the limiting plate 1013 may be manufactured by one manufacturing process. The first supporting plate 1011, the connecting plate 1012, and the limiting plate 1013 may be manufactured by three manufacturing processes respectively; and then, the first supporting plate 1011, the connecting plate 1012, and the limiting plate 1013 are connected.

The second supporting plate 1021, the fifth plate body 1022, the connecting structure 1023, and the supporting structure 1024 included in the second fixing assembly 102 may be an integral structure. That is, the second supporting plate 1021, the fifth plate body 1022, the connecting structure 1023, and the supporting structure 1024 may be manufactured by one manufacturing process. The second supporting plate 1021, the fifth plate body 1022, the connecting structure 1023, and the supporting structure 1024 may be manufactured by four manufacturing processes respectively; and then, the second supporting plate 1021, the fifth plate body 1022, the connecting structure 1023, and the supporting structure 1024 are connected.

Referring to FIG. 8, at least one first connection through hole 101a may be formed in the first fixing assembly 101. Accordingly, at least one third connection through hole corresponding to the at least one first connection through hole 101a may be formed in the first body of the electronic device. The first fixing assembly 101 may be connected to the first body of the electronic device by the at least one first connection through hole 101a and the at least one third connection through hole. In an exemplary embodiment, two first connection through holes 101a are shown in FIG. 8.

For each of the first connection through holes 101a and the third connection through hole corresponding to the first connection through hole 101a, one of the first connection through hole 101a and the third connection through hole may be a light hole, and the other may be a threaded hole. A screw may pass through the light hole first and then through the threaded hole to connect the first fixing assembly 101 to the first body. In an exemplary embodiment, the first connection through hole 101a may be a light hole, and the third connection through hole may be a threaded hole.

Referring to FIG. 9, at least one second connection through hole 102a may be formed in the second fixing assembly 102. Accordingly, at least one fourth connection through hole corresponding to the at least one second connection through hole 102a may be formed in the second body. The second fixing assembly 102 may be connected to the second body of the electronic device by the at least one second connection through hole 102a and the at least one fourth connection through hole. In an exemplary embodiment, two second connection through holes 102a are shown in FIG. 9.

For each of the second connection through holes 102a and the fourth connection through hole corresponding to the second connection through hole 102a, one of the second connection through hole 102a and the fourth connection through hole may be a light hole, and the other may be a threaded hole. A screw may pass through the light hole first and then through the threaded hole to connect the second fixing assembly 102 to the second body. In an exemplary embodiment, the second connection through hole 102a may be a light hole, and the fourth connection through hole may be a threaded hole.

In summary, the present disclosure provides the rotating shaft mechanism of the electronic device, and the first fixing assembly and the second fixing assembly in the rotating shaft mechanism are connected to each other by the first connector and the second connector. The hollow region can be reserved in the rotating shaft mechanism as the first connector and the second connector may be shorter. Thus, the external circuit of the electronic device may pass through the hollow region and be disposed in the second body of the electronic device. The second body can protect the external circuit to avoid damages to the external circuit, such that the reliability of the electronic device is higher. In addition, since the external circuit is disposed in the second body of the electronic device, the better aesthetics of the electronic device is ensured.

Figure 10:
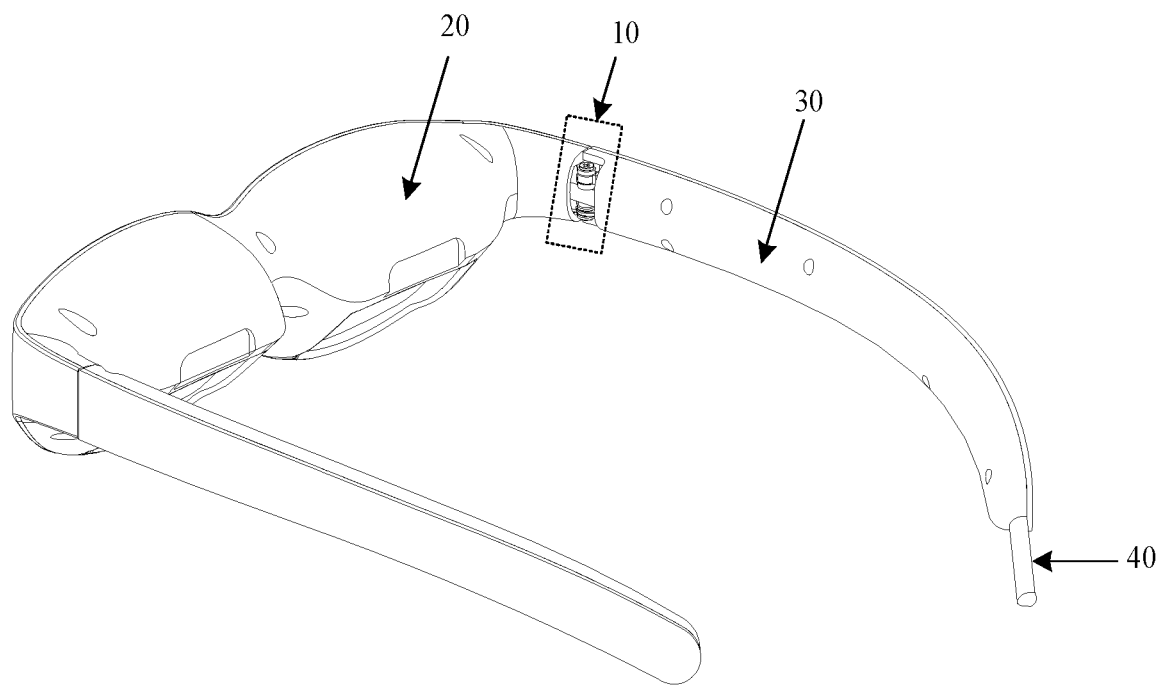
FIG. 10 is a schematic structure diagram of an electronic device according to an embodiment of the present disclosure.

FIG. 10 is a schematic structure diagram of an electronic device according to an embodiment of the present disclosure. Referring to FIG. 10, the electronic device may include: a first body 20, a second body 30, and the rotating shaft mechanism 10 according to any of the above embodiments.

Optionally, the electronic device may further include: an electronic element and an external circuit 40 connected to the electronic element. The electronic element may be disposed in the first body 20; and one end of the external circuit 40 may be connected to the electronic element, and the other end of the external circuit 40 passes through the hollow region in the rotating shaft mechanism 10 and be disposed in the second body 30. Here, the hollow region may include: a region not shielded by the first connector 103 in the first fixing assembly 101 of the rotating shaft mechanism 10, and a region not shielded by the second connector 104 in the second fixing assembly 102 of the rotating shaft mechanism 10.

In the embodiment of the present disclosure, the electronic device may be a wearable device. For example, referring to FIG. 10, the wearable device may be a wearable device like a pair of glasses. The wearable device may further include: a display screen. The first body 20 may be a casing for encapsulating the display screen. The second body 30 may be a temple of the wearable device.

Optionally, the wearable device may be a virtual reality (VR) device or an augmented reality (AR) device.

In summary, the embodiment of the present disclosure provides the electronic device, and the first body and the second body of the electronic device may be rotatably connected to each other by the rotating shaft mechanism. The hollow region can be reserved in the rotating shaft mechanism as the first connector and the second connector in the rotating shaft mechanism may be shorter. Thus, the external circuit of the electronic device may pass through the hollow region and be disposed in the second body. The second body can protect the external circuit to avoid damages to the external circuit, such that the reliability of the electronic device is higher. In addition, since the external circuit is disposed in the second body of the electronic device, the aesthetics of the electronic device is better.

Described above are merely optional embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A rotating shaft mechanism of an electronic device, the rotating shaft mechanism comprising:
    a first fixing assembly, configured to be fixedly connected to a first body of the electronic device;
    a second fixing assembly, configured to be fixedly connected to a second body of the electronic device; and
    a first connector and a second connector, wherein the first connector is rotatably connected to the first fixing assembly and one end of the second connector, and the other end of the second connector is fixedly connected to the second fixing assembly;
    wherein
    a length of the first connector in a target direction and a length of the second connector in the target direction are both less than a length of the first fixing assembly in the target direction, and are both less than a length of the second fixing assembly in the target direction, the target direction being an extending direction of a rotation axis of the first fixing assembly and the second fixing assembly; and
    the second fixing assembly comprises: a second supporting plate and a connecting structure fixedly connected to the second supporting plate;
        wherein the connecting structure is disposed on one side of the second supporting plate distal from the first fixing assembly, and a fifth through hole is formed in the connecting structure, an axis of the fifth through hole being parallel to the second supporting plate; and
        wherein the other end of the second connector is disposed in the fifth through hole and is fixedly connected to the second fixing assembly.

2. The rotating shaft mechanism according to claim 1, wherein the second connector comprises: a first connecting portion having a rod shape, a second connecting portion, and a third connecting portion having a rod shape; wherein
    one end of the first connecting portion is rotatably connected to the first fixing assembly by the first connector, and a first through hole is formed in the other end of the first connecting portion; and the second connecting portion is disposed in the first through hole, the second connecting portion is fixedly connected to one end of the third connecting portion, and the other end of the third connecting portion is fixedly connected to the second fixing assembly;
    wherein a sum of lengths of the second connecting portion and the third connecting portion in an axial direction of the first through hole is greater than a depth of the first through hole.

3. The rotating shaft mechanism according to claim 2, wherein the first through hole comprises: a first sub-through hole and a second sub-through hole which are coaxial, the first sub-through hole being distal from the first fixing assembly relative to the second sub-through hole, and an aperture of the first sub-through hole being less than an aperture of the second sub-through hole; wherein
    the second connecting portion is disposed in the second sub-through hole, and a diameter of the second connecting portion is greater than the aperture of the first sub-through hole and less than the aperture of the second sub-through hole; and
    a diameter of the third connecting portion is less than the aperture of the first sub-through hole.

4. The rotating shaft mechanism according to claim 3, wherein the second connector further comprises: an elastic member sleeved onto the third connecting portion;
    wherein the elastic member is disposed in the second sub-through hole, and a diameter of the elastic member is greater than the aperture of the first sub-through hole and less than the aperture of the second sub-through hole.

5. The rotating shaft mechanism according to claim 4, wherein the elastic member comprises at least one spring.

6. The rotating shaft mechanism according to claim 2, wherein a groove in communication with the first through hole is formed in a side wall of the first connecting portion, and an extending direction of the groove is parallel to an extending direction of the first connecting portion.

7. The rotating shaft mechanism according to claim 1, wherein the first fixing assembly comprises: a first supporting plate and a connecting plate fixedly connected to the first supporting plate;

wherein the connecting plate is perpendicular to the first supporting plate, is disposed on one side of the first supporting plate proximal to the second fixing assembly, and is rotatably connected to the first connector.

8. The rotating shaft mechanism according to claim 7, wherein the first connector is a rod-shaped structure;
the connecting plate comprises a first plate body and a second plate body which are spaced apart in the target direction, wherein the first plate body is parallel to the second plate body, and a distance between the first plate body and the second plate body is less than or equal to the length of the first connector in the target direction;
one end of the second connector is disposed between the first plate body and the second plate body; and
a second through hole is formed in the first plate body, a third through hole is formed in the second plate body, and a fourth through hole is formed in one end of the second connector, wherein the first connector is disposed in the second through hole, the third through hole, and the fourth through hole.

9. The rotating shaft mechanism according to claim 7, wherein the first fixing assembly further comprises: a limiting plate fixedly connected to the first supporting plate;
wherein the limiting plate is disposed on one side of the first supporting plate proximal to the second fixing assembly, and a gap is defined between the limiting plate and the connecting plate in the target direction.

10. The rotating shaft mechanism according to claim 9, wherein the limiting plate comprises: a third plate body and a fourth plate body which are spaced apart in the target direction and are opposite to each other; and
the second fixing assembly comprises: a second supporting plate and a fifth plate body fixedly connected to the second supporting plate, wherein the fifth plate body is disposed on one side of the second supporting plate proximal to the first fixing assembly, and is disposed between the third plate body and the fourth plate body.

11. The rotating shaft mechanism according to claim 1, wherein a sixth through hole is further formed in the connecting structure, an axis of the sixth through hole being perpendicular to the second supporting plate, and intersected with the axis of the fifth through hole; and the rotating shaft mechanism further includes: a riveting member;
wherein the riveting member is disposed in the sixth through hole and is fixedly connected to the other end of the second connector.

12. The rotating shaft mechanism according to claim 1, wherein the second fixing assembly further comprises: a supporting structure fixedly connected to the second supporting plate;
wherein a seventh through hole is formed in the supporting structure, the second connector being disposed in the seventh through hole;
wherein an axis of the seventh through hole is parallel to the axis of the fifth through hole.

13. The rotating shaft mechanism according to claim 1, wherein the first connector is a screw.

14. The rotating shaft mechanism according to claim 1, wherein at least one first connection through hole is formed in the first fixing assembly, wherein each of the at least one first connection through hole is configured to be connected to the first body of the electronic device.

15. The rotating shaft mechanism according to claim 1, wherein at last one second connection through hole is formed in the second fixing assembly, wherein each of the at least one second connection through hole is configured to be connected to the second body of the electronic device.

16. An electronic device, comprising: a first body, a second body, and the rotating shaft mechanism comprising:
a first fixing assembly, configured to be fixedly connected to a first body of the electronic device;
a second fixing assembly, configured to be fixedly connected to a second body of the electronic device; and
a first connector and a second connector, wherein the first connector is rotatably connected to the first fixing assembly and one end of the second connector, and the other end of the second connector is fixedly connected to the second fixing assembly;
wherein
a length of the first connector in a target direction and a length of the second connector in the target direction are both less than a length of the first fixing assembly in the target direction, and are both less than a length of the second fixing assembly in the target direction, the target direction being an extending direction of a rotation axis of the first fixing assembly and the second fixing assembly; and
the second fixing assembly comprises: a second supporting plate and a connecting structure fixedly connected to the second supporting plate;
wherein the connecting structure is disposed on one side of the second supporting plate distal from the first fixing assembly, and a fifth through hole is formed in the connecting structure, an axis of the fifth through hole being parallel to the second supporting plate; and
wherein the other end of the second connector is disposed in the fifth through hole and is fixedly connected to the second fixing assembly; and
the first body and the second body are rotatably connected by the rotating shaft mechanism.

17. The electronic device according to claim 16, further comprising: an electronic element and an external circuit connected to the electronic element; wherein
the electronic element is disposed in the first body, one end of the external circuit is connected to the electronic element, and the other end of the external circuit passes through a hollow region in the rotating shaft mechanism to be disposed in the second body;
wherein the hollow region comprises: a region not shielded by the first connector in the first fixing assembly of the rotating shaft mechanism, and a region not shielded by the second connector in the second fixing assembly of the rotating shaft mechanism.

18. The electronic device according to claim 16, wherein the electronic device is a wearable device, the wearable device further comprising: a display screen;
wherein the first body is a casing for encapsulating the display screen, and the second body is a temple of the wearable device.

19. The electronic device according to claim 18, wherein the wearable device is a virtual reality device or an augmented reality device.

* * * * *